May 27, 1941.　　　　C. X. HASKINS　　　　2,243,461
TIRE TREAD SURFACING MACHINE
Filed March 18, 1939　　　5 Sheets-Sheet 1

Inventor
CURTIS X. HASKINS
By Herbert E. Smith
Attorney

Inventor
CURTIS X. HASKINS
By Herbert E. Smith
Attorney

Inventor
CURTIS X. HASKINS
By Herbert E. Smith
Attorney

CURTIS X. HASKINS
Inventor

May 27, 1941.    C. X. HASKINS    2,243,461
TIRE TREAD SURFACING MACHINE
Filed March 18, 1939    5 Sheets-Sheet 5

CURTIS X. HASKINS
Inventor

By Herbert E. Smith

Attorney

Patented May 27, 1941

2,243,461

UNITED STATES PATENT OFFICE 2,243,461

TIRE TREAD SURFACING MACHINE

Curtiss X. Haskins, Spokane, Wash., assignor of one-half to Isaac G. Parsons, Spokane, Wash.

Application March 18, 1939, Serial No. 262,765

10 Claims. (Cl. 29—76)

The present invention relates to improvements in tire-thread surfacing machines which, while adapted for various uses, is especially designed for use in reclaiming automotive vehicle tires. As is well known the large tires used on busses and trucks are expensive in the first cost, and the treads of such tires wear away much quicker than the side walls and carcasses of the tires, making it desirable to re-tread or re-cap the used tires to reduce the cost of maintenance of the bus or truck.

Before the used tire can properly be re-treaded, it is necessary that certain portions of the worn tread be re-surfaced to insure proficiency in the application of the new tread to the tire, and to this end the worn tread is uniformly smoothed down to required thickness by various devices utilized in the machine, such as a buffing wheel or a rotary rasp, and a rotary cutter, the latter being adapted to cut a strip from the worn tread of the tire. After this required treatment, the "dressed" tread of the tire is ready to receive the new tread. The present invention relates to the mechanism for preparing the worn tread, and this mechanism is both simple in construction and operation, compactly arranged, and adjustable in various ways to adapt a selected tool to the tire, as well as employing an adjustable work holder by means of which the tire may be adjusted to the tool to be used.

The work-holder, or tire-holder is adjustable to receive tires of different sizes, and it is horizontally adjustable in relation to the machine tool by means of which the desired material is removed from the tread portion of the tire. The machine tool for removing the material from the tread-portion of the used tire is also adjustable with relation to the tire and tire-holder, and independent or separate motors are employed for revolving the tire and imparting the required motion to the parts of the tool.

In the accompanying drawings one example of the physical embodiment of the invention is illustrated, wherein, Figure 1 is a view in side elevation showing the tire mounted on its holder, and an end view of the rotary machine tool, together with other accessories of the machine.

Figure 8:
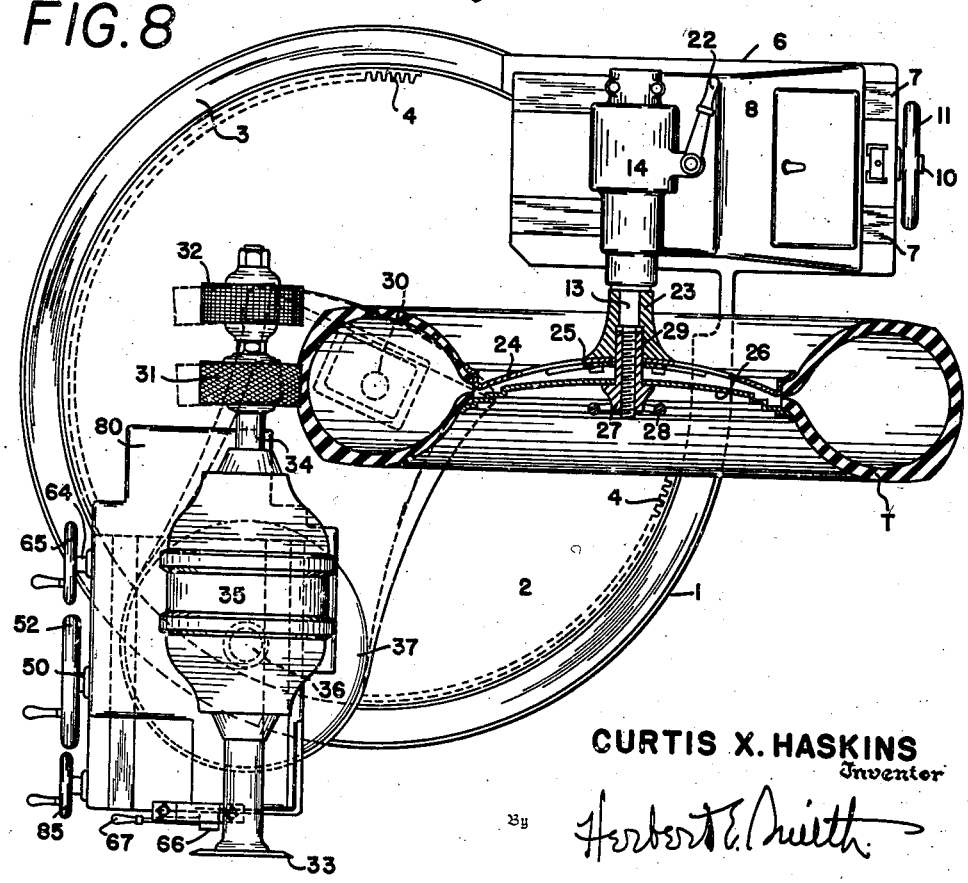
Figure 8 illustrates a top plan view of the machine tool mounted on the base of the machine with the rotary rasp in operative relation to the revolving tire, the latter being shown in section and also mounted on the work holder.

As best seen in Figure 8 a circular or bowl-shaped base 1 is provided for the support of the machine tool and the tire-holder, the closed bottom 2 of the base forming a sump for collecting the water that is used in connection with the operation of the machine, and the top of the base or bowl is fashioned with an inturned circumferential flange 3 having an inner rack 4 with teeth arranged uprightly on the inner edge of the flange.

The work-holder or tire-holder mounted on the base 1 is mounted on a hollow extension 6 of the base, which projects laterally therefrom, and the tire-holder and its stand with the tire T, are adjustable so that the circumferential center of the tire may be moved in a diametrical line over the center 30 as indicated in Figure 8. This adjustment permits tires of variable sizes to be adjusted over the center 30 and with relation to the machine tools.

Figure 5:
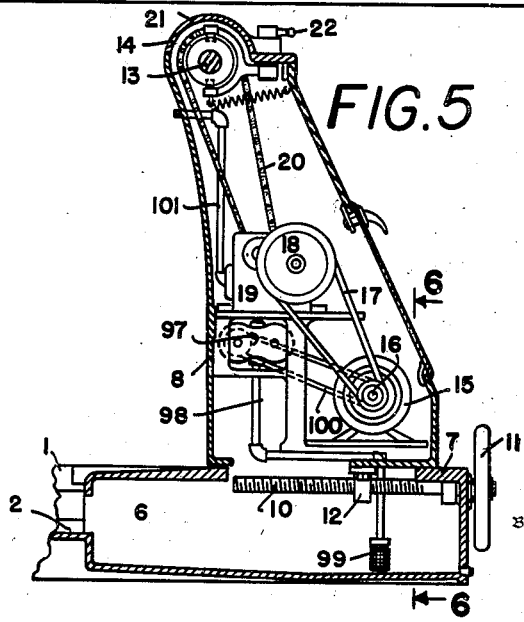
Figure 5 is a vertical sectional view at line 5—5 of Figure 2, showing various operating parts within the housing for the tool.
Figure 6:
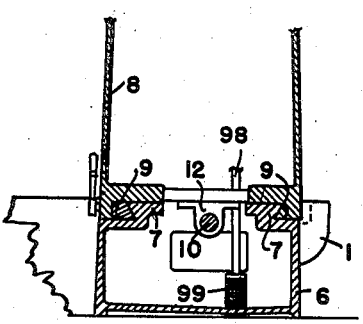
Figure 6 is a vertical sectional detail view at line 6—6 of Figure 5.

This adjustment of the tire T which is mounted on the hollow stand 8 is best seen in Figures 5 and 6, where the extension base 6 is provided with spaced guide flanges 7, 7, and the stand 8 is provided with complementary dove-tail guide flanges 9, 9. A screw bar 10 is journaled in suitable bearings within the extension, and provided with an exterior hand wheel 11, is turned in its journal bearings and in the traveling nut 12 mounted on the screw bar and attached to the tire stand 8, and by this means the stand and tire holder, with the tire, are moved forward or retracted, as desired.

The tire T is supported on its horizontal axis at the top of the tire-stand by means of a holder which revolves with the tire, slowly, in the operation of removing material from the tread-portion of the tire, and this holder includes a horizontal arbor or shaft 13 journaled to revolve in bearings in a housing 14 forming the top of the tire-stand 8. The arbor is driven from an electric motor 15 located in the lower portion of the tire stand 8, and from the drive wheel 16 of the motor a belt 17 extends to the large pulley 18 which is connected to reduction gears within the gear casing 19, and from these reduction gears, a chain belt 20 is connected to and drives the arbor 13.

As best seen in Figure 5 a clutch device 21 is mounted on the arbor in connection with its driving mechanism, and an exterior lever handle 22 is mounted in the top of the housing 14 for controlling the operation of the arbor in revolving the tire T, through the revolvable work holder or tire-holder.

In Figure 8 it will be seen that the tire-holder is mounted on the arbor by means of a hub 23 which revolves with the arbor 13, and the tire holder, of which the hub forms a part, revolves with the tire at comparatively slow speed, due to the use of reduction gears in the gear case 19.

Before mounting the tire in place its center parts are removed and a pair of special circular holder-disks 24 and 26 are mounted in the tire and engaged with the two adjoining beads of the tire. As seen in Figure 8 it will be seen that the inner clamp disk 24 is locked at 25 to the outer end of the hub at 23 with the rim of the disk engaging the bead of the tire, and the outer clamp disk 26 is locked as part of the holder by means of a nut 27 having a hand wheel 28. The nut has a threaded sleeve 29 passing through a center hole in the outer clamp disk 24 and also into a recess in the hub. This sleeve is threaded on the threaded end of the arbor 13, and it will be apparent that by turning the hand wheel 28 of the nut the disks are rigidly joined to the hub to form part of the holder, and the disks also hold the tire in natural position so that one of the tools may be adjusted to proper position for removing material from the worn tread, the rasp wheel 31 being shown in operative position for this purpose, as indicated in Figure 8.

Figure 7:
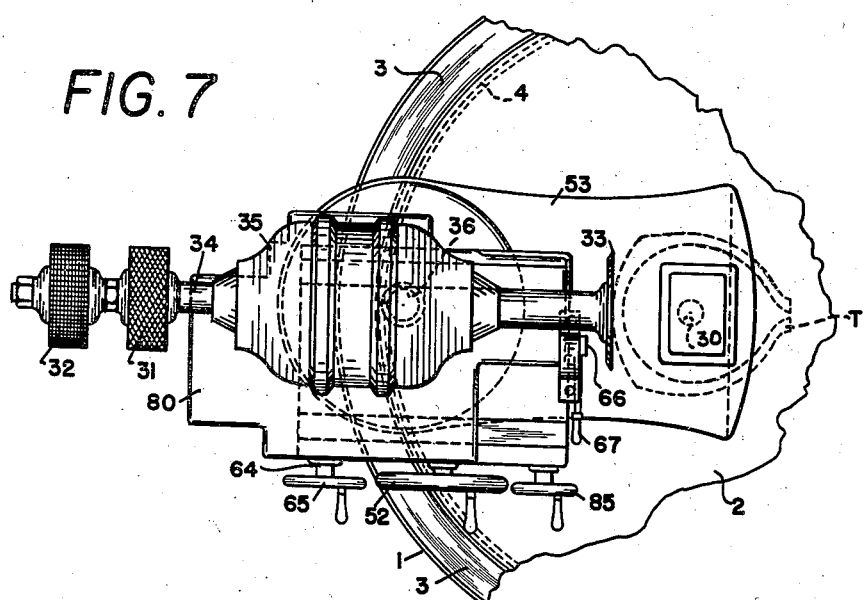
Figure 7 is a top plan view of the machine tool including its motor, rasp wheel, buffing wheel and rotary cutter, mounted on the base of the machine.

In addition to the rasp wheel 31, which has a filing action on the material of the tire, the machine tool as a whole includes a buffing wheel 32 and a rotary cutter or knife 33 properly mounted to rotate with the shaft 34 of the electric motor 35, and the machine tool in addition to being circumferentially adjustable with relation to the center point 30 and the greater part of the periphery of the circular base 1 also has the means whereby the three mentioned tools may be oscillated on the pivot point indicated by dotted lines as 36 in Figures 7 and 8. The re-surfacing tools and their respective mounts forming the tool appliance are manually adjustable circumferentially of the center pin 30; the tool supporting column 37 may be swiveled for adjustment about the center 36; and the rotary tool unit, including the re-surfacing tools, is reciprocal or adjustable longitudinally with relation to the tool supporting column 37.

Figure 4:
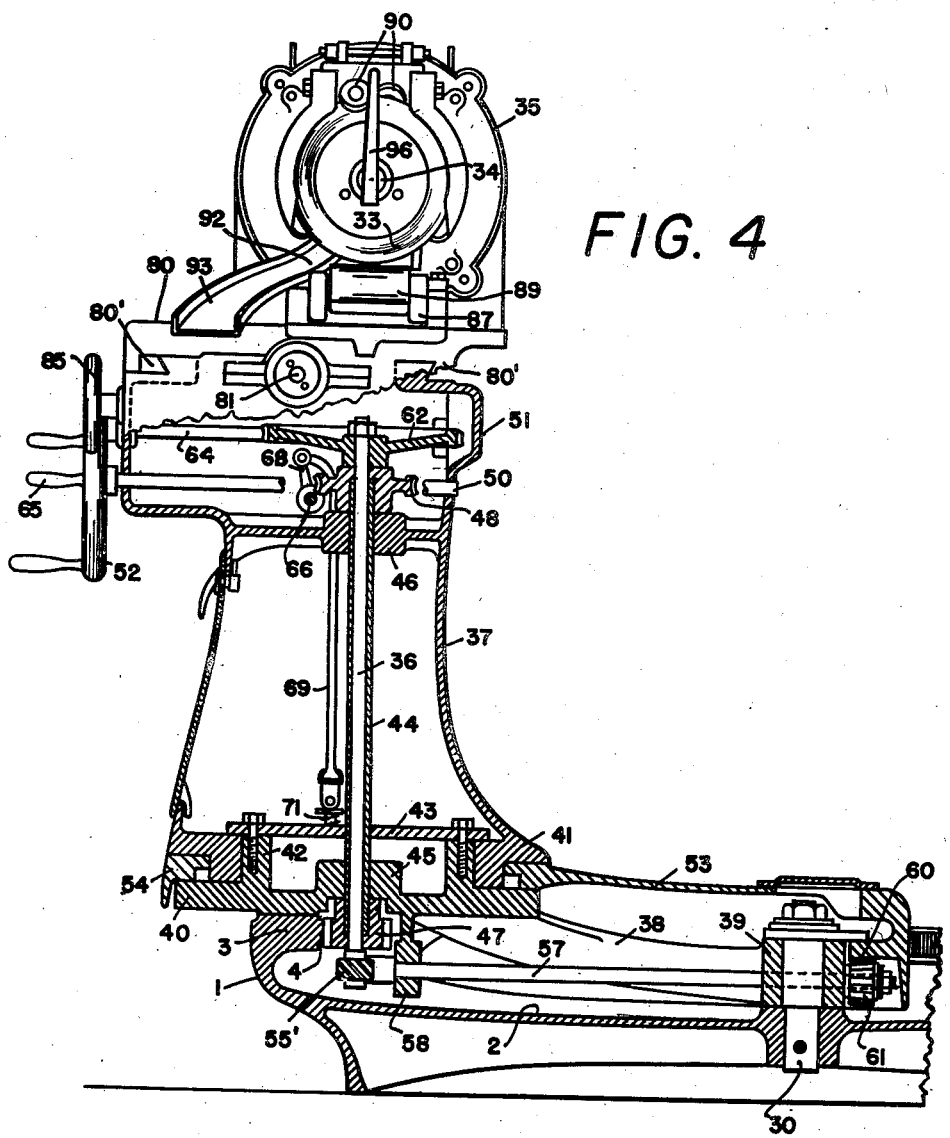
Figure 4 is an end view of the machine tool with its adjustable stand in section, and means for adjusting the machine tool.

As best seen in Figure 4, the column 37 is mounted at the outer end of a carrier-frame 38, which frame has at its inner end a hub 39. The outer end of the carrier-frame 38 is fashioned with a base-plate 40, partly resting upon the top face of the flange 3 of the base 1, and this base-plate 40 forms the bottom support of the swivel column 37.

The column 37 is fashioned with a swivel ring 41 that rests upon the base-plate 40 and surrounds an inner, upright bearing flange 42 of the base plate 40, and a locking disk 43, which overlaps the swivel ring 41, is bolted to the flange 42 to retain the column 37 in its swiveled relation to the frame 38. Thus it will be apparent that the column 37 and its swivel ring 41, while mounted on the carrier-frame to swing therewith on pin 30, are also swiveled to turn on the plate 40 and flange 42.

For swinging, or oscillating the entire tool machine and its mount on its center pin 30, around the periphery of the supporting flange 3 of the base of the machine within limits of the interrupted rack 4 of the flange, a tubular shaft 44, concentric with the inner, solid shaft 36, is journaled in a lower bearing 45 of the base plate 40, and the tubular shaft, together with the solid central shaft 36 is also journaled in an upper bearing 46 which is rigid with the walls of the column 37.

At its lower end, below the bearing 45, the tubular shaft has mounted thereon a pinion 47 which meshes with the rack 4 of the flange 3 or interrupted gear ring of the machine base 1, and at its upper end this tubular shaft has a worm wheel 48 just above the bearing 46. A smaller worm-pinion 49 is mounted on a worm shaft 50 which is mounted in bearings in the gear housing 51 forming an enlarged hollow head for the column 37. The horizontal shaft 50, extending at right angles to the tubular shaft 44, has an exterior hand wheel 52 which is employed to operate the worm-gearing 48—49 and the tubular shaft 44, with its pinion 47 engaging the internal gear ring 4 of the machine base. Through this hand operated mechanism the entire tool mount is turned or adjusted circumferentially of the machine base 1 to bring the rotary cutter 33 or either of the wheels 31 and 32 into operative position with relation to the tire, as seen in Figures 7 and 8.

For the purpose of locking the tool mount in stationary adjusted position with relation to the machine base, against both circumferential movement and other adjusting movements, including a swivel movement of the column 37 on the base ring 40, suitable means are employed as follows:

By working from the center of the tire as in Figure 7 toward each side successively, it is possible to remove any desired quantity (within limits) of the worn rubber tread, and cuts with a tolerance of one-sixteenth of an inch are practicable.

Under certain circumstances it is necessary for the operator to change the position of the rotary cutter 33 with relation to the face of the tread of the tire, and also of the rasp wheel as well as the buffing wheel, and this adjustment is obtained by using the pivot 36 as a center.

Figure 9:
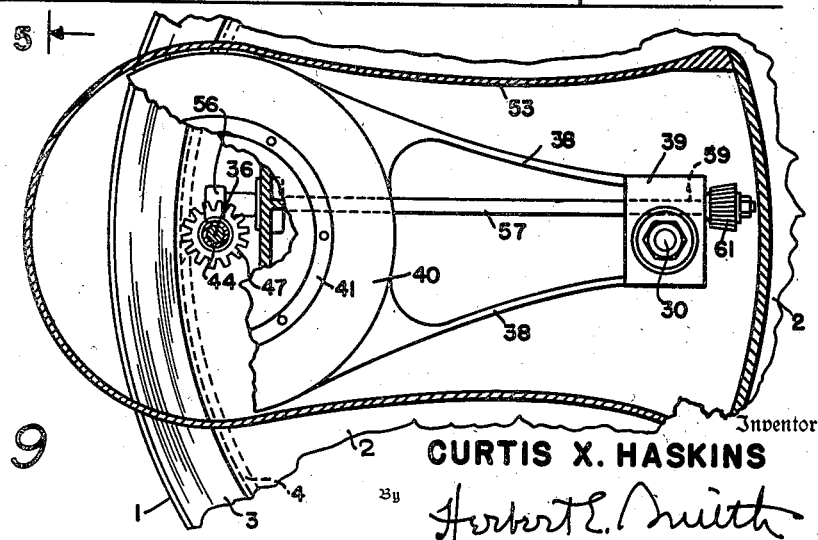
Figure 9 is a horizontal sectional view at line 9—9 of Figure 3, showing the means for circumferentially adjusting or horizontally oscillating the machine tool.

As best seen in Figures 4 and 9, at the swivel joint between the ring 41 and the base ring 40 and its flange 42, a broad adjusting plate 53 having side flanges extends over the center pin 30 at one end, and at the other end this plate has a circular flanged collar 54 with its main body portion resting on the swivel base plate and under a flange portion of the swivel ring 41.

The center of this collar 54 is the shaft 36, and this shaft has a worm gear or spiral gear 55' thereon which meshes with a similar gear 56 on the horizontally extending shaft 57 that is journaled in bearings at 58 under the base swivel ring, and also in bearings 59 rigid with the center bearing or hub 39. On the inner end of the shaft 57 a bevel gear 61 is mounted, and the adjacent wall of the adjusting plate is fashioned with an arcuate rack 60 which meshes with the bevel gear 61.

As seen in Figure 4, the upper end of the center or solid shaft 36 is provided with a worm gear 62 located in the housing or hollow head 51 just above the smaller worm gear 46, and this worm gear 62 (Figure 3) is engaged by a small driving pinion 63 on the work shaft 64 which projects in bearings through the gear housing 51. By turning the hand wheel 65 on the outer end of the shaft 64, the bevel pinion 61 in engagement with the rack 60 of the adjusting plate 53, and the entire tool unit is swung on the shaft 36 as a center, as indicated by dotted lines in Figure 8. By this means the rotary tools may be adjusted (after the tool unit has been approximately adjusted) to the conformation of the tire tread which of course is not always round or arcuate with 30 as its center, and the rasp wheel for instance when thus adjusted is permitted to travel on the contour of the tire tread regardless of the relation of the tool to the tire centered over the center point 30 of the tool.

In Figure 8 the buffing wheel and rasp wheel may be adjusted to approximate position with relation to the tire, and then by turning the hand wheel 65 the rotary tool may be given a precise adjustment relative to the tire.

For locking the column 37 against turning, I employ a pair of spring dogs or clutches. An operating shaft 66 (see Figure 4) journaled in suitable bearings in the head 51 is turned by means of an exterior hand lever or handle 67.

Within the hollow head 51 the operating shaft 66 has a pair of crank arms 68 (see Figures 3 and 4) and connecting rods 69 depending therefrom down through the column 37. Each rod 69 terminates in an offset head 70 through which a bolt 71 passes and a spring 72 is interposed between the top face of the head and a nut 73 is threaded on the bolt. The bolt 71 is pivoted at 74 in the forked end of the head, and the lower end of the bolt also passes through a hole in the swivel ring 41. A second spring 75 is interposed between the lower part of the head and the upper face of the swivel ring, the second spring 75 being stronger than the first mentioned spring 72, in order that the stronger spring may hold the bolt or clutch in uplifted position, to prevent relative movement of the swivel ring 41 and the collar 54.

On the lower end of the bolt is provided a head in the form of a flat circular disk 76 which forms a clutch member movable to the locked and unlocked position of the swivel ring 41 and the collar 54. This clutch disk cooperates with an annular groove 77 in the collar and also with a series of spaced semi-circular sockets 77' recessed from the annular groove.

The swivel ring 41 also has an annular groove 78 and a series of spaced inset sockets 78', the two annular grooves being of sufficient depth to permit the clutch disk 76 to move freely therethrough when the dogs or clutches 76 are unlocked or disengaged. To lock the related parts together, the handle 67 is depressed to pull the two disks 76 up into a pair of complementary sockets 77' and 78' thereby locking the related parts together. By turning the handle 67 the bolts 71 are depressed into the annular grooves 77 and 78; that is, the heads 67 of the bolts are depressed into these parts to provide freedom of movement of the relatively movable parts.

Figures 3, 10, 11:
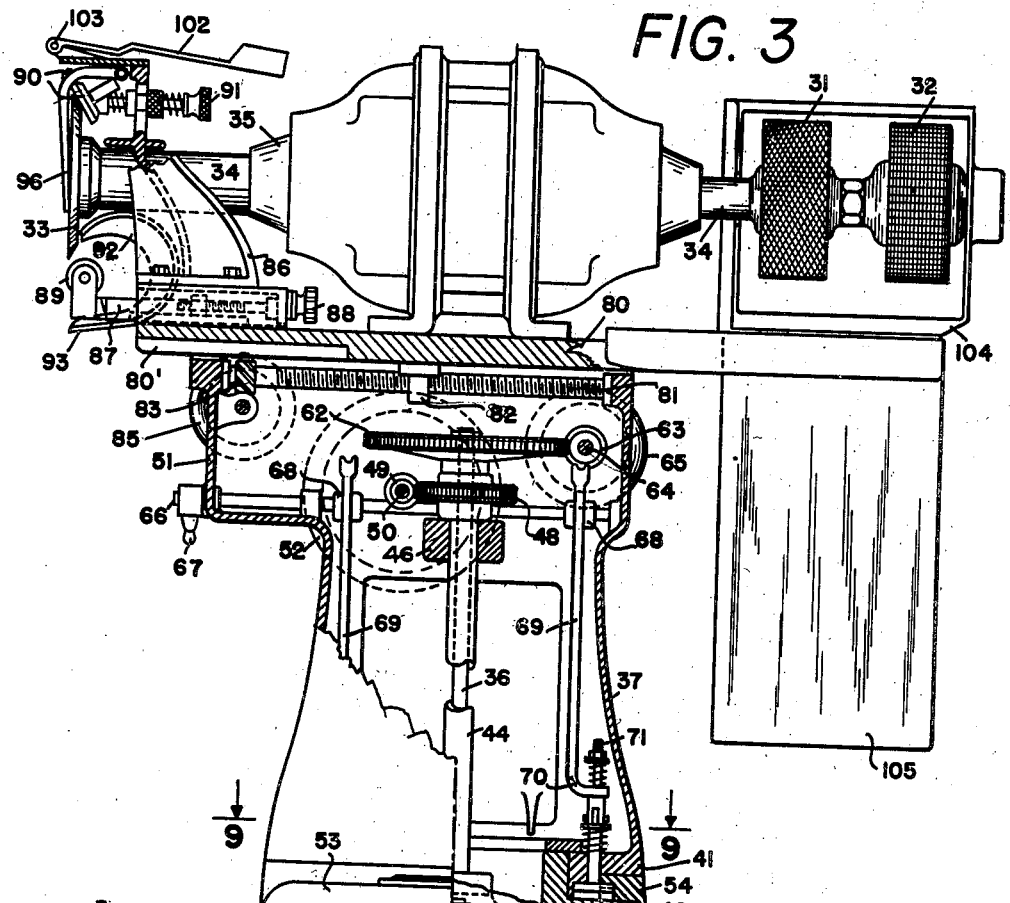
Figure 3 is an enlarged view in elevation and partly in section showing the machine-tool with its rotary cutter, rotary rasp, and rotary buffing wheel, and showing also the manually operated means for adjusting the position of the machine tool.
Figure 10 and Figure 11 are detail sectional views of the means for locking the base of the machine tool to the base of the machine.

As best seen in Figure 3, the rotary tool unit including the electric motor 35, the rotary cutter 33, the rasp wheel 31 and the buffing wheel 32, are mounted upon a motor base plate 80 to be adjusted longitudinally on the complementary ways or dove-tail slides 80', 80' of the motor plate and the top of the hollow head 51 of the column 37.

For reciprocating or sliding the rotary tool unit longitudinally of the motor base plate 80 in the grooved ways 80', I employ a screw bar 81 mounted in bearings near the top of the head or gear casing 51, and this screw bar passes through a traveling non-rotatable nut 82 fixed to the under face of the motor base plate 79. The screw bar 81 has a spiral gear-couple at 83 (Fig. 3) with the operating shaft 84, and the latter is provided with a hand wheel 85 exterior of the casing. By turning the hand wheel in Figure 7 it will be apparent that the rotary cutter 33 may be advanced or retracted with relation to the tire, and in Figure 8 the rasp-wheel 31 may be shifted to bring the buffing wheel 32 into operative position with the tire, or the rasp wheel may be shifted across the tread of the revolving tire.

Various accessories are utilized to improve the construction and operation of the machine, especially in connection with the rotary tool mount.

In Figure 3 an auxiliary stand 86 is mounted on the end of the motor base-plate adjacent the rotary cutter or knife, and this stand is provided with an adjustable, angular bracket arm 87 which arm may be projected and retracted in a housing, by turning the hand wheel 88. At the outer angular end of the bracket arm is journaled a gaging wheel or roller 89, which is adjustable, by turning the hand wheel 88 toward and from the worn tire tread to gage the cut of the rotary cutter. The roller gage is projected in front of the knife to determine the thickness of the strip, and the roller when projected contacts with the tire tread in advance of the cutter.

For sharpening the rotary cutter and maintaining a proficient cutter edge during the process of paring or peeling the tire tread I employ a pair of sharpening disks 90 which are mounted in an upward extension frame of the stand 86, at the upper edge of the cutter, and these sharpening disks are adjustable for frictional contact, or abrading, with the rotary cutter, the bevel edge of the cutter being engaged by the faces of the disks and the latter are rotated by frictional contact with the cutter. Adjusting and spring operated means are indicated at 91 for varying the pressure of the sharpening disks against the edge of the cutter.

In Figure 3, at the rear of the bottom edge of the rotary cutter is arranged a trough 92 which is mounted on the stand 86 and designed to receive the cuttings from the rotary cutter and convey them to one side, as in Figure 4; the mouth of the trough being in position to receive the cuttings of rubber from the tire. The trough is somewhat U-shaped, and as seen in Figure 4 it extends laterally of the machine with its outlet end 93 in position to deposit the cuttings into a receptacle at one side of the cutter mount and outside of the circular base of the machine.

Figure 1:
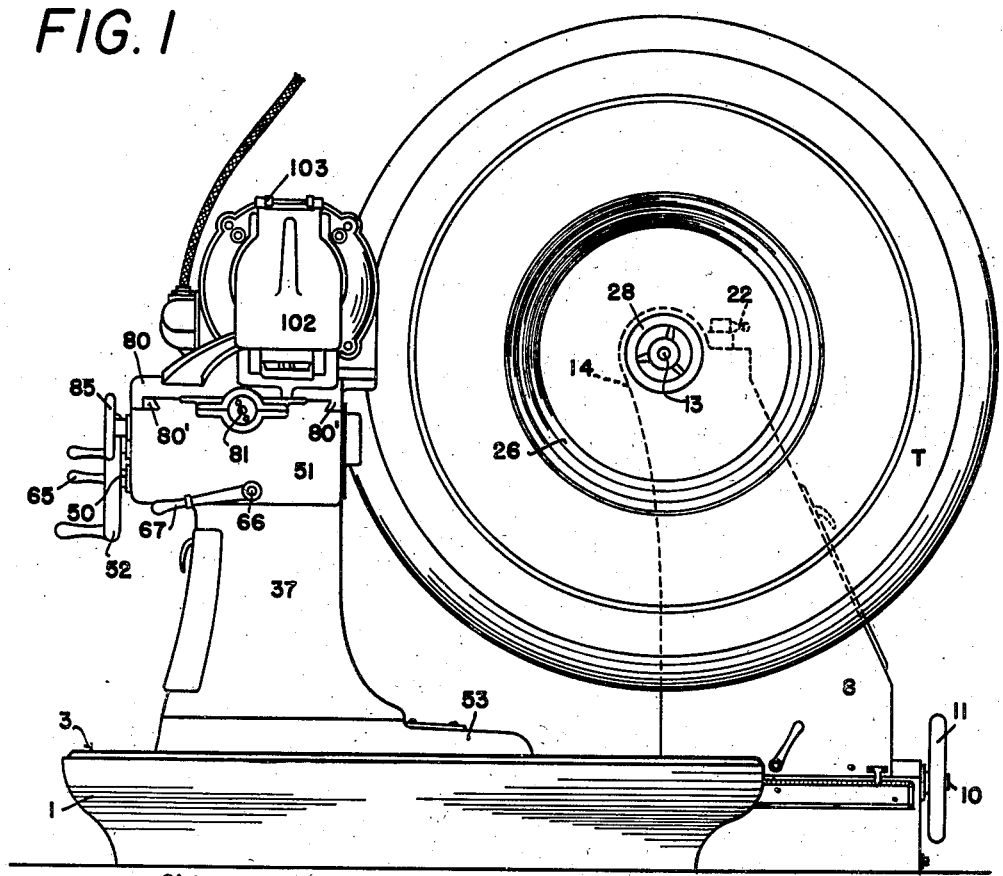
Figure 2:
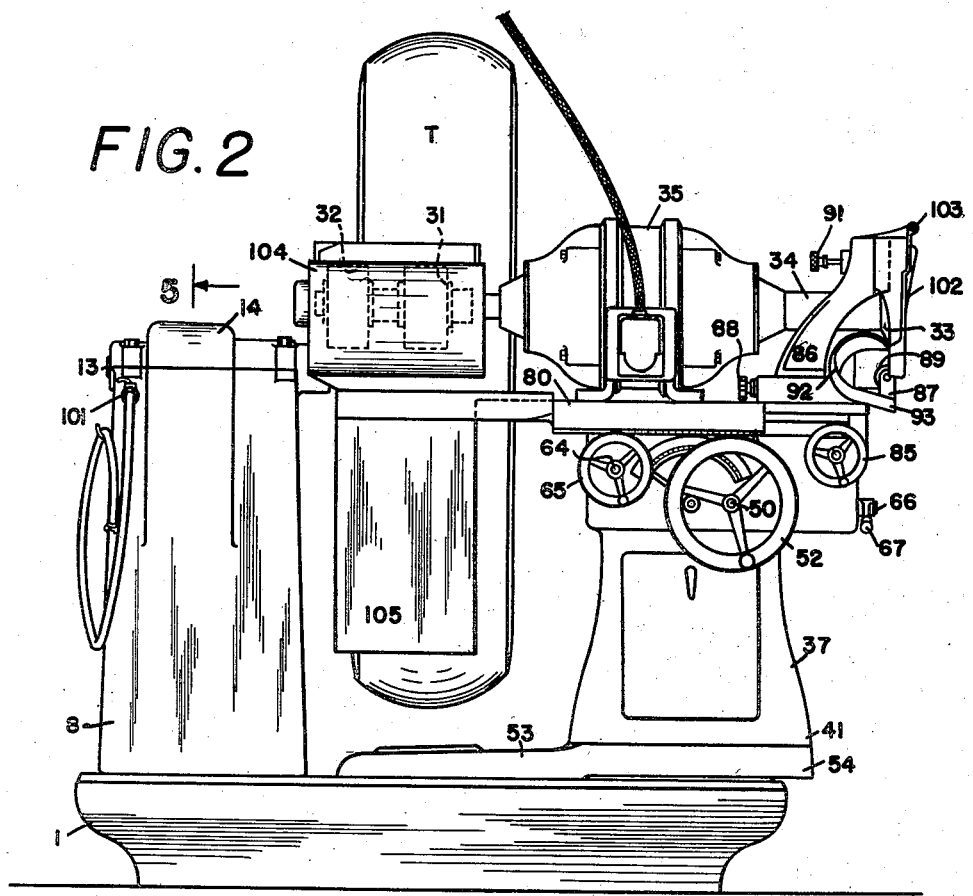
Figure 2 is a side elevation of the machine, looking from the left in Figure 1.

To prevent excessive heat at the cutting point of the rotary cutter I provide for a thin stream of water that flows down over the front of the knife or cutter and also sprays the tire tread, and thereby prevents excessive heat due to friction between the rotary cutter and the tire tread. As seen in Figures 1 and 2 a reservoir or receptacle for water is provided in the base 1. A hose is connected to a nozzle 96 which depends from the top portion of the extension frame of the stand 86 and discharges the water over the outer face of the rotary cutter. The used water then falls into the sump formed at the bottom of the machine base or bowl. In Figure 5 a pump 97 is shown mounted in the tire stand 8 and having an inlet pipe 98 extending downwardly into the sump 6 where it terminates in a screen 99 located at the bottom of the sump. The pump, as shown in Figure 5, is driven from the motor 15 by a belt drive 100 to the pump, and the outlet pipe 101 from the pump is connected in suitable manner to a hose.

A guard plate 102, which is hinged at 103 to the extension frame of the auxiliary stand, may be swung down from open position in Figure 3 to cover the rotary cutter, when the knife is not being used.

At the end of the rotary tool unit where the rasp wheel and the buffing wheel are located, a hood 103 and a hopper 104 are located in front of and below these wheels and adjacent the tire tread of the revolving tire, and debris from these wheels is collected in these receptacles and suitably disposed of.

It will be noted that the motor shaft 34 is elongated at both ends of the motor to accommodate the rotary cutter at one end and the rasp wheel and buffing wheel, and the rotary tool unit is capable of being turned end for end, or to various other positions, so that the use of the rasp and the buffer may follow the cutter. This swiveling of the rotary tool mount or unit also permits the cutter to be readily adapted to the tire tread, and also permits the rasp wheel and buffing wheel to be so adjusted.

In cutting a strip of rubber from the tread of the tire the device as arranged substantially shown in Fig. 7, the roller 89 which may be seen in Fig. 3 but which has been omitted from Fig. 7 for convenience of illustration, is brought into engagement with the tire tread at a point directly below the cutting edge of the knife 33 in such a manner as to gauge or govern the depth of the cut to be taken. By revolving the tire T on the shaft 13 and by revolving the knife 33 it would be apparent that a thin and continuous strip of rubber will be removed from the tire tread.

Because of the arcuate shape of the tread of the tire in horizontal cross section, the position of the knife 33 must be varied. By turning the hand wheel 52 and thus operating the pinion 47 on the leg 4 it would be apparent that the stand 37 and head 51 and the motor base plate 79 will swing in an arc around the center 30. Of course, during the operation of changing the knife it is retracted from the face of the tire by the operator who turns the hand wheel 85. When a new position is assumed the operator adjusts the knife 33 and the roller 89 to a new engagement on the tread of the tire. In like manner successive periperal cuts are made to trim the tire the desired shape. From the position of Fig. 7 the rotary tool mount may be turned to the position of Fig. 8 by use of the swivel joint. In this new position the brushes 31 and 32 are brought into operating position for buffing, or otherwise treating the tread of the tire.

Having thus fully described my invention, what I claim as new and desire to secure by Letters Patent is:

1. In a tire-tread surfacing machine, the combination with a rotary tire holder, means for adjusting and means for revolving the holder, of a mount having rotary tools at its opposite ends, a rotatable column supporting said tool mount and having lower notches, a machine base, pivoted means on the base for supporting said column, a rotatable adjusting plate and having spaced notches alignable with said lower notches on the tool column, between the column and the pivoted means, means for rotating said adjusting plate, and spring held means detachably engaged in said aligned notches to lock said column to said adjusting plate.

2. In a tire-tread surfacing machine, the combination with a base, an adjustable rotary tire holder and means for revolving the tire holder, of a pivot pin located in the base alined with the interior circumferential center of a tire, a supporting frame pivoted on said pin and means for swinging said frame about the pin, a column supported on said frame and having locking notches, a rotatable ring between said frame and said column, said ring having notches alignable with the notches on said column, means comprising a spring held key engaged in said alignable notches for locking said column to said ring, means for rotating said ring, and a rotary tool unit mounted on said column.

3. In a tire-surfacing machine, the combination with a base having an inner gear ring, and a center pin, of a frame pivoted on the pin and having a base-plate supported on the gear ring, a tool column swiveled on said base-plate, and a rotary-tool unit adjustable on the column, a driving pinion mounted in the column and engaging said gear ring, and means for turning said driving pinion.

4. In a tire-surfacing machine, the combination with a base having an inner gear-ring, and a center pin, of a frame pivoted on the pin and having a circular base plate resting on the gear-ring, a hollow column having a swivel ring mounted on the base-plate and means for locking said swivel ring to the base ring, an upright drive shaft mounted in the column, a pinion at the lower end of the shaft engaging the gear ring, and means for revolving said shaft.

5. In a tire-surfacing machine, the combination with a base plate having an inner gear ring, and a center pin, of a frame pivoted on the pin and having a circular base plate, a hollow column having a swivel ring mounted on the base plate, an upright shaft mounted in the column, a pinion on the lower end of said shaft engaging the gear ring, means for revolving said shaft, and an adjustable tool-mount on said column.

6. In a tire-surfacing machine, the combination with a base having a center pin, of a frame pivoted on said pin and having a base-plate, a hollow column having a swivel ring mounted on said base-plate, co-acting means supported by the column and the base for circumferentially swinging said column about said center pin, an annular ring pivoted on said base plate and cooperable with said swivel ring, means for rotating said annular ring, and an adjustable rotary-tool-unit mounted on the column.

7. In a tire-surfacing machine, the combination with a base having a center pin, a frame pivoted on the pin and having a base plate at its free end, and means for swinging the base plate and frame on said pin, of a tool-mount-column having a swivel ring on the base plate, an adjusting plate having an annular collar between the base plate and swivel ring and pivotally supported on the base plate, and means for swinging said adjusting plate on its pivot.

8. In a tire-surfacing machine, the combination with a base having a center pin, a frame pivoted on the pin and having a base plate on its free end, means for swinging the base plate and frame on the pin, a tool mount comprising a column having a swivel ring cooperable with the base plate, an adjusting plate having an annular collar on one end located between the swivel ring and the base plate and a rack adjacent the other end, means for disengageably locking the swivel ring to the annular collar, a shaft supporting a pinion in mesh with said rack, and means for operating said shaft.

9. In a tire-surfacing machine, the combination with a base having a center pin, a frame pivoted on the pin and having a base-plate at its free end, of a tool mount comprising a column having a swivel ring rotatably mounted on the base-plate, an adjusting plate having at one end an annular collar between the base-plate and swivel ring, said adjusting plate having an arcuate rack adjacent its opposite end, a central shaft mounted in the column, a horizontal shaft having bearings in the base plate and the hub of the pivoted frame, said shaft having a driving gear engaging the arcuate rack, a driving gear-couple between the central shaft and the horizontal shaft, means for driving the central shaft, a concentric tubular shaft mounted on the central shaft and means for operating said shaft, a pinion on the tubular shaft, an inner gearring on the base with which the last mentioned pinion engages, and means for operating said tubular shaft to effect pivotal movement of the base plate, the tool mount and the column about the center pin.

10. In a tire-surfacing machine, the combination with a base having a center pin and a frame pivoted on said pin having a base plate, a hollow column supporting a rotary tool unit and having a swivel ring mounted on said base plate, an annular ring having a lower inner annular groove, said ring being pivoted on said base plate and also having spaced semi-circular sockets recessed from said annular groove, spring-pressed lock bolts supported by said swivel ring and having heads engageable in the semi-circular sockets of the annular ring to lock the annular ring to the swivel ring, means for disengaging the lock bolts from the semi-circular sockets to permit independent movement of the swivel ring and annular ring.

CURTISS X. HASKINS.